United States Patent
Pipon et al.

(10) Patent No.: US 7,496,365 B2
(45) Date of Patent: Feb. 24, 2009

(54) METHOD OF OPTIMIZING SCHEDULING IN A COMMUNICATIONS SYSTEM OF CDMA TYPE

(75) Inventors: Francois Pipon, Paris (FR); David Depierre, Paris (FR)

(73) Assignee: Thales (FR)

( * ) Notice: Subject to any disclaimer, the term of this patent is extended or adjusted under 35 U.S.C. 154(b) by 397 days.

(21) Appl. No.: 10/589,466

(22) PCT Filed: Jan. 12, 2005

(86) PCT No.: PCT/EP2005/050109

§ 371 (c)(1),
(2), (4) Date: Aug. 14, 2006

(87) PCT Pub. No.: WO2005/088999

PCT Pub. Date: Sep. 22, 2005

(65) Prior Publication Data

US 2008/0123598 A1    May 29, 2008

(30) Foreign Application Priority Data

Feb. 13, 2004    (FR)    .................... 04 01475

(51) Int. Cl.
*H04Q 7/20*    (2006.01)
*H04Q 7/34*    (2006.01)
*H04Q 7/36*    (2006.01)
*H04Q 7/00*    (2006.01)
*H04B 7/216*    (2006.01)

(52) U.S. Cl. .................. 455/446; 455/423; 455/67.11

(58) Field of Classification Search ............... 455/446, 455/423, 450, 67.16; 370/329, 342
See application file for complete search history.

(56) References Cited

U.S. PATENT DOCUMENTS 5,991,285 A * 11/1999 Ghosh .................. 370/335

(Continued)

FOREIGN PATENT DOCUMENTS

EP    1 098 545    5/2001

(Continued)

OTHER PUBLICATIONS

Ki-Hong Kim et al Development of the CDMA system performance analysis tool (CDAT) Vehicular Technology Conference, 1996. Mobile Technology Conference, 1996. Apr. 28-May 1, 1996 New York, USA.

(Continued)

*Primary Examiner*—Nick Corsaro
*Assistant Examiner*—Michael Mapa
(74) *Attorney, Agent, or Firm*—Lowe Hauptman Ham & Berner, LLP (57) ABSTRACT

Method of optimizing scheduling in a communications network of CDMA type comprising at least the following steps:
  detect the base stations received at a measurement point by means of multisensor synchronization, and for each of them estimate the propagation channel, h(0, s), . . . , h(L−1, s), estimate the received powers Pi,
  determine the base station or stations of highest levels which define a group of active stations {Gsa},
  on the basis of the results obtained in the preceding steps, estimate for each base station of the group of active stations {Gsa}, the reception filter g (0, s, a) implemented by a mobile situated at the measurement point for the reception of the station considered,
  estimate, for each slot s and each antenna configuration a of the mobile, the ratio $E_s/I_0$, on the basis of the estimates of the propagation channel, and deduce therefrom the interference factor IF associated with the mobile placed at the measurement point.

10 Claims, 2 Drawing Sheets

U.S. PATENT DOCUMENTS 6,128,500 A * 10/2000 Raghavan et al. ........... 455/453
2003/0100299 A1   5/2003 Dobson et al.
2004/0259554 A1 * 12/2004 Rappaport et al. .......... 455/446

FOREIGN PATENT DOCUMENTS

| EP | 1098 545 | 5/2001 |
|---|---|---|
| FR | 2 715 488 | 7/1995 |
| FR | 2 715 488 A | 7/1995 |
| FR | 2 820 933 | 8/2002 |

OTHER PUBLICATIONS

Ki-Hong, Kim et al., "Development of the CDMA System Performance Analysis Tool (CDAT)", Vehicular Technology Conference, 1996., Mobile Technology For The Human Race, IEEE 46th Atlanta, GA, USA Apr. 28-May 1, 2006, New York, NY, USA, IEEE, US, Apr. 28, 1996, pp. 1400-1403, XP010162621, ISBN: 0-7803-3157-5.

* cited by examiner

METHOD OF OPTIMIZING SCHEDULING IN A COMMUNICATIONS SYSTEM OF CDMA TYPE

CROSS-REFERENCE TO RELATED APPLICATIONS

The present Application is based on International Application No. PCT/EP2005/050109, filed on Jan. 12, 2005, which in turn corresponds to French Application No. 04 01475 filed on Feb. 13, 2004, and priority is hereby claimed under 35 USC §119 based on these applications. Each of these applications are hereby incorporated by reference in their entirety into the present application.

The invention relates to a method allowing, for example an operator, to optimize the scheduling in a cellular communications network of CDMA type (the abbreviation standing for Code Division Multiple Access).

It makes it possible to estimate the performance of a network and to optimize the scheduling of networks already deployed on the basis of measurements carried out in the field, notably by taking account of the effect of the propagation channel, of the intracellular and extracellular interference.

It applies, for example, in respect of the scheduling of UMTS (Universal Mobile Telecommunication System), IS95, CDMA2000 networks etc. It finds its application in the analysis of the quality of service of third-generation mobile telephone networks.

It can also apply in respect of metrology functions, functions for aiding cellular scheduling and for dimensioning networks.

A mobile telephone/telecommunication network consists of cells covering the geographical zone in which the operator wishes to be present. Each cell is associated with a base station with which the mobile receivers situated in the cell are in contact.

The quality of service of a mobile telephone network depends on numerous parameters, including notably the following: the position of the base stations, their power, the number of users per cell, the obstacles between the mobile receiver and the base station.

At the present time, various scheduling tools are offered to operators for predicting the quality of service obtained on the network as a function of various parameters, such as the number of users, the position and the service associated with each user, etc. These tools integrate propagation models making it possible to predict the level of each base station received at any point of the network. It is also interesting to integrate in these scheduling tools, a modelling of the orthogonality loss factor defined hereinafter, that it is important to estimate well since it makes it possible to determine the level of intracellular interference due to multi-path propagation. The intracellular interference corresponds to the interference generated by all the users of the cell with which the mobile is in contact. The propagation models introduced into the scheduling tools have a given accuracy and are useful for the dimensioning of the network. They are however insufficient for accurately estimating the real performance of a deployed network. Under these conditions, operators need measurements performed in the field to estimate the performance of their networks and optimize cellular scheduling.

In order to evaluate the quality of scheduling of their network, operators determine the zones where each service (voice, 64 kps, 144 kps, etc.) is ensured. These zones depending on the overall traffic loading of the network. They are defined in general for an unfavorable case with a uniformly heavily loaded network, for example 50%. Currently, operators commonly use field measurements of the $E_c/I_0$ of the pilot channel as network scheduling criterion, where $E_c$ corresponds to the chip energy of the pilot channel and $I_0$ to the total power of the received signal. Thresholds are associated with each service offered by the operator, thus making it possible to determine whether or not the service can be ensured at the measurement point. This criterion nevertheless exhibits certain drawbacks, for example:

it is in practice unusable when the measurement is made on a network with traffic loading. Specifically, the operator does not know the loading of the network at the moment of the measurement. If the network is unloaded, the operator can deduce from the ratio $E_c/I_0$ obtained at the moment of the measurement the ratio $E_c/I_0$ which would be obtained when the network is loaded with a uniform loading, it is degraded by the uniform power increase caused by the traffic loading. On the other hand, if the network is loaded, it is impossible for the operator to deduce from the ratio $E_c/I_0$ obtained at the moment of the measurement, the ratio $E_c/I_0$ which would be obtained when the network is loaded with a uniform loading, It is a relatively rough criterion which does not take into account the processing of the RAKE receiver, defined hereinafter, implemented by the mobile and therefore which accounts imperfectly for the quality of reception by a mobile at the measurement point.

The invention relies notably on taking accurate account of the real local conditions in the criterion termed the interference factor, notably: the effect of the propagation channel, the intracellular and extracellular interference.

In the present description the expression "measurement point" designates a point of the network where the analysis device according to the invention is disposed, the geographical location of a network where a mobile might be found.

The invention relates to a method of optimizing scheduling in a communications network of CDMA type comprising one or more base stations and one or more mobile users, the signals exchanged being composed of one or of several frames consisting of slots s. It is characterized in that it comprises at least the following steps:

a) position an analysis device comprising one or more reception pathways suitable for detecting the base stations received at a measurement point by means of multisensor synchronization, b) for each detected base station, estimate the propagation channel, h(0, s), . . . , h(L−1, s), between the measurement point and the device, with L the length of the propagation channel, c) on the basis of the power of the paths returned by the channel estimation, estimate the received powers Pi for all the detected base stations, d) determine the base station or stations of highest levels which define a group of active stations {Gsa}, e) on the basis of the results obtained in steps a) to d), estimate for each base station of the group of active stations {Gsa}, the reception filter g (0, s, a) implemented by a mobile situated at the measurement point for the reception of the station considered, f) estimate, for each slot s and each antenna configuration a of the mobile, the ratio $E_s/I_0$, on the basis of the estimates of the propagation channel, and deduce therefrom the interference factor IF associated with the mobile placed at the measurement point, g) determine the services that can be ensured at the measurement point and compare the value of the interference factor IF obtained in step f) with the threshold values dependent on each type of service.

The network is for example a UMTS or IS95 or CDMA2000 network.

The invention notably makes it possible to provide a new scheduling criterion suitable for CDMA type networks, criterion based on field measurements, and exhibits the following advantages:

It can be used on a loaded or unloaded network,

It makes it possible to estimate the quality of service of a CDMA link, on the basis of measurements carried out in the field, It makes it possible to estimate the influence of each of the interfering stations, and therefore to determine the base stations responsible for the pollution of the pilot channel at each measurement point, It takes into account the characteristics of the receiver installed on the mobile (for example the number of fingers of a Rake receiver) and the propagation characteristics to accurately estimate the levels of the intracellular interference and of the extracellular interference, It makes it possible to estimate the performance obtained in the case where the mobile is in contact with several base stations, case known by the expression "soft Handover".

Other characteristics and advantages of the present invention will be further apparent on reading the description which follows of an exemplary embodiment given by way of wholly nonlimiting illustration and the appended figures which represent.

The idea relies notably on the consideration of the real local conditions, such as the effect of the propagation channel, the intracellular and extracellular interference, in the criterion designated "interference factor". This criterion is notably used to manage the resources of the network.

Briefly, for each interfering station, even weak, the associated levels and the impulse responses of the propagation channel are estimated. On the basis of these estimates, the interference factor is calculated.

In order to better elucidate the method according to the invention, the example given hereafter relates to a UMTS FDD application (the abbreviation standing for Universal Mobile Telecommunication System Frequency Division Duplex). It also applies to any CDMA link.

Before setting out the principles of the invention, a few reminders on the form of the signals and their modelling are given.

Figure 1:
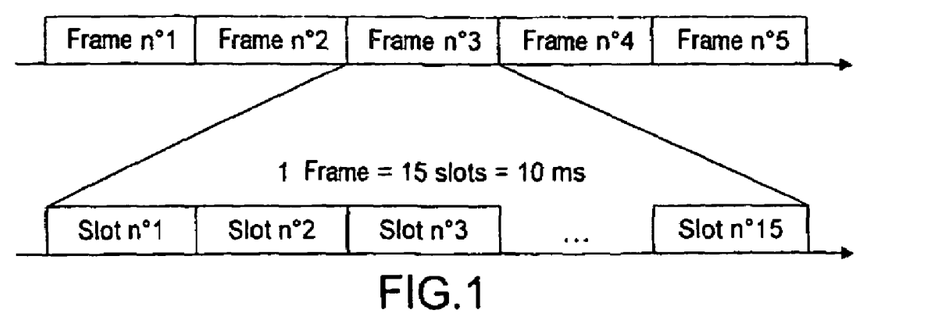
FIG. 1 the composition of a UMTS signal.

FIG. 1 models the composition of the UMTS signal emitted by a base station towards one or more mobiles (downlink). The signal d(t) consists of several frames, each frame comprising, for example, 15 slots of fixed duration.

Figure 2:
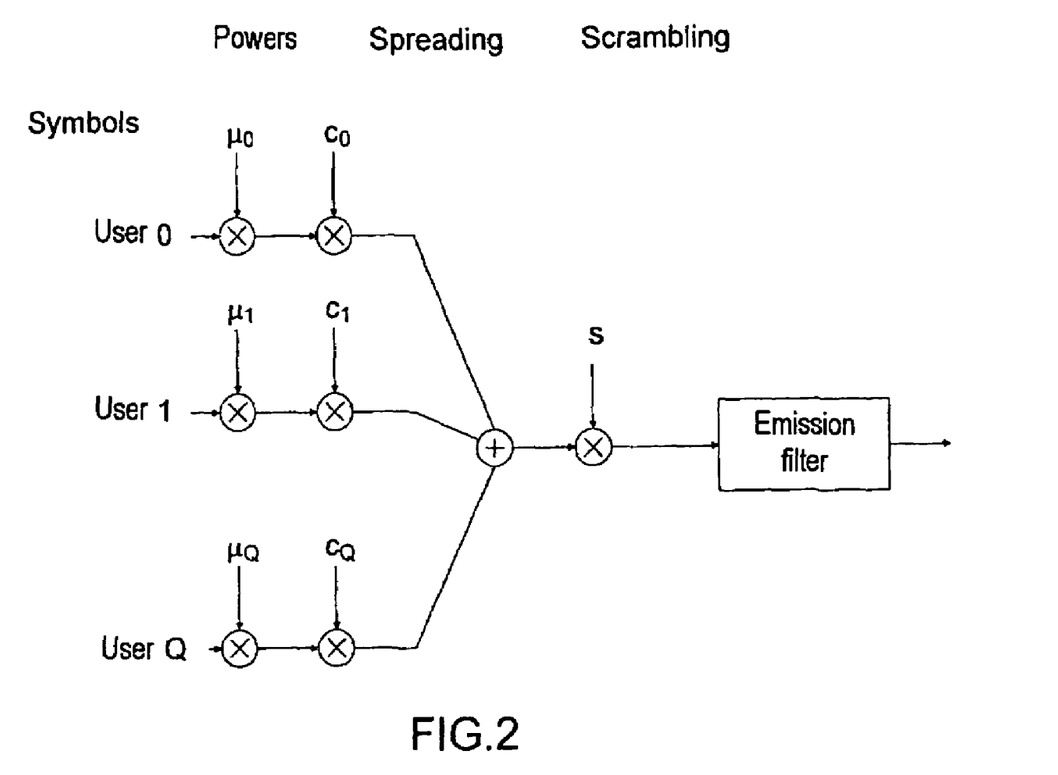
FIG. 2 a downlink modulator.

FIG. 2 shows diagrammatically an exemplary modulator for the downlink.

The signal intended for a given user consists, for example, of binary elements called "bits". These bits are grouped together pairwise to form "Q-PSK" symbols (the abbreviation standing for Phase Quadrature Shift Keying).

The Q-PSK symbols, denoted $b_q(0), \ldots b_q(L-1)$ intended for a user q are firstly multiplied by a power factor $\mu_q$. Each symbol is thereafter modulated by a sequence, called the spreading sequence denoted $c_q$ of +/−1 and of size $N_q$, spreading factor. Thus, on the basis of the symbol $b_q(l)$ we form the series $\mu_q b_q(l) c_q(0), \ldots \mu_q b_q(N_q-1) c_q(0)$, where l is the index of the sample.

The spreading sequences $c_q$ are orthogonal so that:

$$\sum_{n=0}^{\min(N_q,N_p)} c_q(n)c_p(n) = N_q \quad \text{if} \quad p = q \qquad (1)$$
$$= 0 \quad \text{otherwise}$$

The series thus formed are then multiplied term by term by a series of symbols, +/−1 +/−i, called the scrambling code s. This series is periodic, of frame period, and is constructed so as to simulate a random signal.

The resulting signal to be emited is then expressed by the expression:

$$d(l \cdot N_q + n) = \sum_{q=0}^{Q} \mu_q b_q(l) c_q(n) s(l \cdot N_q + n) \qquad (2)$$

This signal passes through an emission filter and is broadcast by the base station for the attention of the mobiles.

Modelling of a Signal Received by a Mobile

The signal is received on a network of sensors equipping the mobile after having passed through the radio channel between the mobile and the useful base station. After sampling according to a procedure known to the person skilled in the art, it is expressed, for example, by means of the relation:

$$x(n) = \sum_{k=0}^{L-1} d(n-k)h(k) + \sum_{i=1}^{N_{Int}} d_i(n-k)h_i(k) + b(n) \qquad (3)$$

The bold-italic characters designate vectors (of dimension the number of sensors), the index k corresponds to the index of the path, x(n) is the vector of the signals received at the instant n on the network of sensors, h is the multi-sensor channel of the signal emitted by the useful base station, h(k) corresponds to the path k of the propagation channel. L is the size of the impulse response of the channel, $N_{Int}$ is the number of stations which interfere with the useful base station (station detected as being the station of highest level, with which the mobile gets in contact), $d_i(n)$ is the signal emitted by the interfering station number i, $h_i(k)$ is the multi-sensor channel between the interfering station of index i and the mobile, and b(n) is additive noise modelling the thermal noise.

The mobile generally implements a linear UMTS receiver, which consists of a spatio-temporal equalizer filter, of a descrambling and of a despreading. At the output of the spatio-temporal equalizer, the received signal may be written for example in the form:

$$y(n) = \sum_{p=0}^{P-1} g(p)^H x(n+p) \qquad (4)$$

where g(p) is the $p^{th}$ spatial component of the equalizer filter, the exponent "$^H$" corresponds to the conjugate transpose of g(p), P the length of the impulse response of the receiver implemented. At the output of the descrambler, the signal may be written:

$$z(n)=s^*(n)y(n) \quad (5)$$

where s*(n) is the conjugate of the spreading code (or scrambling code as it is termed) at the instant n. Finally, after the despreading, we obtain:

$$r = \frac{1}{N_p} \sum_{n=0}^{N_p-1} c(n)z(n) \quad (6)$$

The receiver decides as a function of the value of r, the symbol which has been emitted. Specifically, r is equal to the symbol emitted plus noise due to the intracellular and extracellular interference, as well as to the thermal noise. If this noise is too significant, the decision taken by the receiver may be erroneous. The bits emitted are then not correctly demodulated.

The description which follows relates to multisensor linear reception implemented by the mobile, thereby notably comprising conventional monosensor reception by a Rake receiver. The latter is specifically based on a filtering by a linear filter whose M coefficients correspond to the M coefficients of highest energies of the impulse response of the propagation channel. M is customarily called the "number of fingers" of the Rake receiver.

As has been indicated previously, the analysis device is positioned at various points of the network called "measurement points", which correspond to points where a mobile might be situated.

Figure 3:
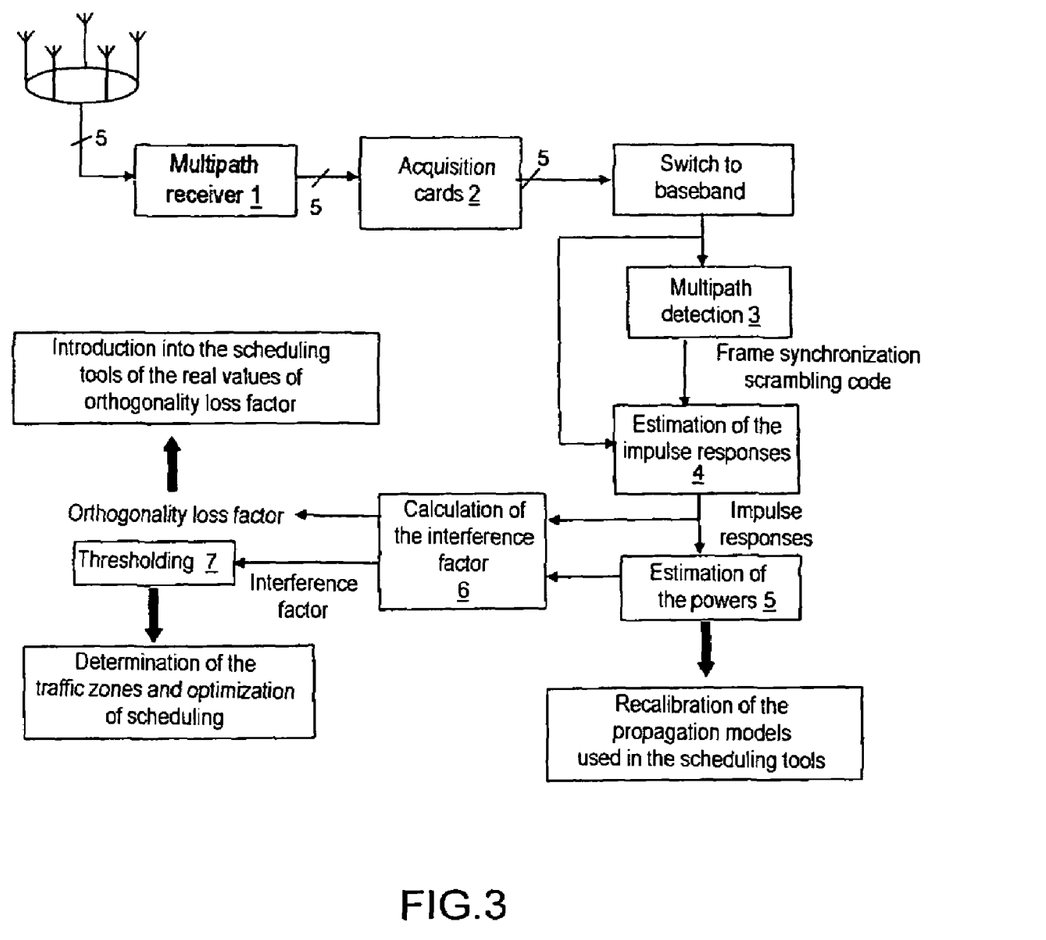
FIG. 3 a functional diagram of the method according to the invention.

The analysis device suitable for implementing the steps of the method according to the invention, possesses for example an architecture such as that described in FIG. 3. The signals are received on a multipathway receiver 1, associated with one or more acquisition cards 2 allowing digitization of the signal. The digitized signals are thereafter processed by a multipathway detection module 3, a module 4 for estimating the impulse responses, a module 5 for estimating the powers and a module 6 allowing the calculation of the interference factor followed by a decision or thresholding module 7. These various modules belong for example to a suitable microprocessor.

The module for estimating the powers allows notably the recalibration of the propagation models used in the network scheduling tools customarily used. The thresholding module for example makes it possible to determine traffic zones and the optimization of scheduling.

FIG. 3 shows diagrammatically an example of running the steps executed by the method according to the invention.

Step 1—Measurement of the Signal on the CDMA Network to be Analyzed

This step consists in digitizing the signal received by the receiver of the analysis device for each measurement point (or analysis point) desired, at the frequency designated by the operator and in performing the switch to baseband of the digitized signal.

Step 2—Detection of the Interfering Stations

On the basis of the baseband signal received on each of the elements of the network of sensors of the analysis device, perform multisensor synchronization so as to detect the base stations received at each measurement point. This step has notably the function of detecting the interfering stations by detection of the synchronization sequence of the signal (synchronization criterion on the basis of the received signal and of the reference sequences). This multisensor synchronization is performed for example in 3 steps:

1—detection of the sequences of primary synchronization (P-SCH) present at the start of each slot of the UMTS FDD frame. This step provides the slot synchronization.

2—detection of the sequences of secondary synchronization (S-SCH) present at the bit rate of each slot of the UMTS FDD frame and determination of the scrambling code group (1 group out of a possible 64). This step provides the frame synchronization.

3—detection of the scrambling sequence used by the detected base station (one sequence out of the 8 possibilities of the scrambling code determined during step 2).

The 3 synchronization steps consist notably in calculating a synchronization criterion on the basis of the received signal and of the reference sequences corresponding to the P-SCH, S-SCH and P-CPICH channels. Any procedure known to the person skilled in the art can be used to perform this step, notably the procedures used for monosensor applications if the device comprises a single antenna or the multisensor procedure such as that described in patent FR 2 715 488 if the device comprises several antennas. The use of the multisensor synchronization algorithm allows the detection of weak stations nevertheless having an impact on the performance of a mobile.

Specifically, for a UMTS FDD network, a detection performed with a sensor does not generally make it possible to detect certain stations of weak level, which, when they are heavily loaded, can significantly degrade the performance of a mobile situated at the analysis point. This phenomenon is all the more noticeable when the measurement is made on a network comprising a significant traffic loading.

In the present description, the term "multisensor" also covers the particular case of a network comprising a single sensor.

On completion of this step 2, the base stations received at the measurement point are detected, with their frame synchronization and their scrambling code.

Step 3—Estimation of the Propagation Channels

In this step, the method carries out first of all on each slot of a frame of the signal, for example on the basis of the sequence carried by the pilot P-CPICH channel, an estimation of the propagation channel for each detected base station, between the station and the measurement point, doing so on each sensor of the analysis device in the case where its receiver comprises several sensors. Hereinafter, for each slot s, the impulse response of the propagation channel associated with the useful base station is denoted: $h(0,s), \ldots, h(L-1,s)$, those associated with the interfering base stations: $h_i(0,s), \ldots, h_i(L_i-1,s)$. The vectors $h(k,s)$ and $h_i(k,s)$ are of dimension $N_{path}$, where $N_{path}$ is the number of sensors of the device. In order to improve the performance, this estimation is made on 2 samples per chip.

A useful base station corresponds to a base station with which the mobile placed at the analysis point would be linked. In the case where several stations are detected with similar levels, a mobile placed at the analysis point can be in contact with each of these stations and subsequently, each of these stations will be considered in its turn as useful base station, the other stations being regarded as interfering stations. The set of base stations with which the mobile is in communication is called the "active set" of the mobile.

The channel estimation is performed, for example, slot by slot by one of the procedures known to the person skilled in the art, for example by correlation of the received signal with the sequence of the pilot P-CPICH channel, followed possibly by a weighting of the coefficients of the channel impulse response thus obtained, for example as described in patent application FR 2 821 502.

Step 4—Estimation of the Received Powers Pi with i the Index of a Station,

Estimate the average powers of the P-CPICH channels of the various base stations detected on the basis of the power of the main paths returned by the channel estimation. The power Pi is expressed in the following manner:

$$Pi = \frac{1}{Npath * Nslot} \sum_{s} \sum_{i} h(i,s)^H h(i,s)$$

where $h(i,s)^H$ corresponds to the conjugate transpose of the vector h(i,s), Nslot to the number of slots on which the estimation is carried out and $N_{path}$ to the number of antennas of the network of sensors of the device.

On the basis of this estimation are determined on the one hand the base station of highest level, the so-called server base station (or "best server") and on the other hand the base stations belonging to the "active set" group. The estimation of the powers of the channels makes it possible in fact to define a group of stations belonging to "the active set" of the mobile at the measurement point, that is to say the base stations whose level lies less than x dB from the level of the dominant station (x corresponds to a threshold defined by the operator, typically of the order of 5 dB).

On completion of step 4, the analysis device has performed various measurements which will be used to estimate the interference factor related to a mobile station which would be disposed at a given measurement point.

Step 5—Estimation of the Reception Filter

Estimate the reception filter implemented on each slot s by the mobile for the reception of a useful base station so as to evaluate in step 6 the performance obtained through the implementation of this filter: g(0,s,a), ..., g(P−1,s,a).

The index a corresponds to an antenna configuration index, A corresponds to the set of antenna configurations taken into account for the reception by the mobile:

if the mobile performs a reception on 1 sensor, a corresponds to the index of the antenna taken into account in the network of $N_{path}$ implemented by the device, and the filter g is a temporal filter. The set of antenna configurations then corresponds to the number of pathways of the device A={1,2, ..., $N_{path}$} if the mobile performs a reception on several sensors, a corresponds to the indices of the antennas taken into account and the filter g is a spatio-temporal filter. For example, if the mobile performs a reception on two antennas, the set of antenna configurations comprises pairs of two antennas chosen from among the $N_{path}$ ones of the device, for example: A={(1,2), (2,3), ..., ($N_{path}$−1, $N_{path}$)}

At the present time, reception on mobiles is performed by taking into account a sensor, but there is nothing to prevent this reception being performed in future on several sensors, so as to improve the performance of the mobiles by intelligent multisensor processing (diversity, antiscrambling). The invention makes it possible to determine the upshot of such processing on the performance of the network, by calculating the associated interference factor, whatever the number of sensors used in the processing implemented by the mobile.

The use of several sensors notably allows the detection of stations of weak level, which when they are loaded, intervene on the performance of a mobile, resulting in better estimation of the interference factor.

By way of example, in the case of the RAKE receiver with M fingers, with M≦P, the impulse response of the filter g extends over a time horizon of P samples, but only M coefficients are nonzero:

$g(k_i,s,a)=h(k_i,s,a)$ with i=1, ... M, the indices $k_i$ corresponding to the M paths of highest power, $g(k_i,s,a)=0$ otherwise.

In this formula, $h(k_i,s,a)$ denotes the restriction of the multisensor channel $h(k_i,s)$ corresponding to the antennas of the antenna configuration a.

On completion of step 5, we are in possession of the filter implemented by a mobile whose performance we wish to evaluate, for the reception of a useful base station on each slot s and on each antenna.

The operation of a receiver whose performance is evaluated by the method according to the invention comprises the steps described previously (formulae (4) through (6))

Spatio-temporal filtering by the filter g (temporal filtering in the case of the monosensor receiver), Descrambling by the scrambling code, Despreading by the CDMA OVSF spreading code associated with the mobile u of spreading factor Nu.

This step is performed for each useful base station, that is to say belonging to the group of active base stations (active set group). The following step consists in determining the interference factor used as network scheduling criterion.

Step 6—Estimation of the Interference Factor

On the basis of the results obtained during the preceding steps, the interference factor can be calculated for each slot s and for each antenna configuration a at each measurement point, for a mobile which would be placed at these measurement points according to the steps described hereafter.

Determine first of all, the ratio $E_s/I_o$ at the output of the receiver implemented by a mobile situated at the measurement point for each useful base station. The ratio $E_s/I_o$ corresponds to the signal/(noise+interference) ratio where the interference term can be broken down into an intra-cellular interference term corresponding to the interference generated by all the users of the cell when the propagation is done by multipaths (in the absence of multipaths, this term is zero since all the codes are orthogonal) and an extra-cellular interference term resulting from the other base stations.

The estimation of the ratio $E_s/I_o$ for a station whose performance we wish to evaluate is based on the following functions, calculated on the basis of the estimates of the propagation channel:

$$R_{gh}(m,s,a) = \sum_{k=0}^{L-1} g(k+m,s,a)^H h(k,s,a) \quad (7)$$

$$R_{gh_i}(m,s,a) = \sum_{k=0}^{L_i-1} g(k+m,s,a)^H h_i(k,s,a)$$

$$R_{gg}(m,s,a) = \sum_{k=0}^{L_i-1} g(k+m,s,a)^H g(k,s,a)$$

for m=−L, ... , L.

The contribution to the overall interference of the intracellular interference is calculated by virtue of the formula:

$$I_{Intra}(s,a) = Ps \times \frac{\sum_{\substack{m=-L, \\ m \neq 0}}^{L} |R_{gh}(m,s,a)|^2}{|R_{gh}(0,s,a)|^2} = Ps \times \alpha(s,a) \qquad (8)$$

where Ps designates the total power of the main station normalized with respect to the power of its P-CPICH channel and $\alpha(s,a)$ the orthogonality loss factor.

The contribution to the overall interference of each station i is calculated by virtue of the formula:

$$I_{Station\ i}(s,a) = Ps_i \times \frac{\sum_{m=-L_i}^{L_i} |R_{gh_i}(m,s,a)|^2}{|R_{gh}(0,s,a)|^2} = Ps_i \times \beta_i(s,a) \qquad (9)$$

where Psi is the power of interfering station number i normalized with respect to its P-CPICH channel and $\beta_i(s,a)$, the extracellular interference factor of station i. The term extracellular designates interference caused by the nonuseful base stations.

The contribution to the overall interference of the thermal noise is calculated by virtue of the formula:

$$I_{thermal\ noise}(s,a) = \sigma^2 \times \frac{|R_{gg}(0,s,a)|}{|R_{gh}(0,s,a)|^2} = \sigma^2 \times \gamma(s,a) \qquad (10)$$

where $\sigma^2$ is the power of the thermal noise.

The ratio of signal to interference plus noise at the output of the receiver whose performance we wish to evaluate is then given by the formula for each slot s and each antenna configuration a:

$$E_s/I_0(s,a) = \frac{Nu \times Pu}{I_{Intra}(s,a) + \sum_i I_{Station\ i}(s,a) + I_{thermal\ noise}(s,a)} \qquad (11)$$

$$= \frac{Nu \times Pu}{P_S \alpha(s,a) + \sum_i P_{Si} \beta_i(s,a) + \sigma^2 \gamma(s,a)}$$

where Pu designates the power of the user u (normalized by the power of the P-CPICH channel) whose performance we wish to evaluate and Nu its spreading factor.

By neglecting the thermal noise and by assuming that all the stations emit with the same power with respect to the power of their respective P-CPICH channels ($P_S = P_{Si} = P$), the ratio $E_s/I_0$ can then be written, for each slot s and each antenna configuration a, in the form:

$$E_s/I_0(s,a) = \frac{Nu \times Pu}{P} \times \frac{1}{\alpha(s,a) + \sum_i \beta_i(s,a)} \qquad (12)$$

$$= \frac{Nu \times Pu}{P} \times IF(s,a)$$

where IF(s,a) is the interference factor:

$$IF(s,a) = \frac{1}{\alpha(s,a) + \sum_i \beta_i(s,a)}. \qquad (13)$$

The interference factor is calculated on each slot where the propagation channel has been estimated and on each configuration of antenna network taken into account for the processing performed by the mobile. It can thereafter be averaged over each slot so as to improve its estimation and render it less prone to fading. It can also be averaged over the various configurations of antennas formed on the basis of the antennas of the device. These various averagings make it possible to allow for the mean ratio $E_s/I_0$ at the output of a receiver implemented by a mobile moving at the measurement point.

The interference factor can also be calculated when the mobile is in contact with several base stations. By assuming that the base stations of the "active set" group of the mobile emit the same power destined for the mobile, the interference factor is obtained by adding together the interference factors obtained by the formula (13) for each base station of the "active set" group. In this estimation, each base station of the active set is in its turn regarded as useful base station for which steps 5 and 6 are performed, all the other detected stations (including the other stations of the active set) being regarded as interfering stations.

Thus, steps 5 and 6 are repeated as many times as there are useful base stations belonging to the "active set" group.

The interference factor depends only on the propagation channels associated with each of the base stations received at the measurement point, as well as the reception filter used, conventionally a filter based on a monosensor Rake receiver with N fingers. The fact of having assumed that the base stations all emit with the same power with respect to the power of their P-CPICH channels has made it possible to render this factor independent of these powers. This hypothesis corresponds to that which is made by the majority of operators for performing their scheduling, the resulting interference factor can therefore be used as scheduling criterion.

The detection of all the base stations by means of several sensors, for example, allows accurate estimation of the interference factor.

The interference factor can be estimated whatever the loading at the moment of the measurement. The traffic loading can influence the number of base stations detected, and therefore the accuracy of the estimation, not the possibility of calculating it.

Step 7: Comparison with a Threshold

The interference factor IF is thereafter compared with various thresholds for each service that the operator wishes to put in place.

On the basis of the interference factor IF obtained via the formula (13), we determine, via the formula (12), the ratio $E_s/I_0$ at the output of a receiver implemented by the mobile at the measurement points, in the case where the network is uniformly loaded. For each service that the operator wishes to put in place, this ratio $E_s/I_0$ makes it possible, for example, to determine the binary error rate before decoding and thereafter the binary error rate after decoding via correspondence tables. The binary error rate after decoding makes it possible to determine the associated quality of service. The interference factor therefore makes it possible to determine the quality of service associated with each type of service offered by the operator. As described in the patent, the guarantee of good estimation is afforded by the modelling which is done of the real behaviour of a mobile implementing a Rake receiver.

The operator can therefore implement thresholds on the interference factor for each service and determine the service zones. With each service offered by the operator, thresholds relating to the value of the interference factor are associated making it possible to determine whether or not the service can be ensured at the measurement point. When the interference factor is less than the threshold fixed for a given service over a given zone, the operator can determine the cause of the degradation:

The main base station is received with too weak a level,

Too large a number of base stations are received with significant levels. The operator can then identify the base stations responsible for the degradation and quantitatively evaluate the degradation introduced so as to best determine the correction to be made.

The operator can thus review his scheduling and as the case may be:

Decrease or increase the powers emitted by certain base stations,

Modify the inclinaison of the antennas,

Add base stations over insufficiently covered zones.

One of the advantages of the device is that it can be used without any interaction with the network while operational, notably, it is not necessary of turn off one or other of the stations or to know the database of the operator.

Moreover, the calculations performed for determining the interference factor also make it possible to estimate, by virtue of the measurements performed in the field, the orthogonality loss factor which characterizes the intracellular interference due to multi-path propagation. The invention also offers the advantage of using measurements performed in the field.

The estimation of the levels allows a recalibration of the propagation models used in the scheduling tools customarily used.

The estimation of the interference factor makes it possible to provide a simple and effective criterion for determining the quality of service offered at the measurement points.

Without departing from the scope of the invention, the steps described above are executed for a network of multi-sensor antennas, and also for a receiver comprising a single sensor.

The invention claimed is:

1. A method of optimizing scheduling in a communications network of CDMA type comprising one or more base stations and one or more mobile users, the signals exchanged being composed of one or of several frames consisting of slots s, comprising the following steps:

a) positioning an analysis device comprising one or more reception pathways suitable for detecting the base stations received at a measurement point by means of multisensor synchronization, b) for each detected base station, estimating the propagation channel, $h(0, s), \ldots, h(L-1, s)$, between the measurement point and the device, with L the length of the propagation channel, c) on the basis of the power of the paths returned by the channel estimation, estimating the received powers Pi for all the detected base stations, d) determining the base station or stations of highest levels which define a group of active stations {Gsa}, e) on the basis of the results obtained in steps a) to d), estimating for each base station of the group of active stations {Gsa}, the reception filter g (0, s, a) implemented by a mobile situated at the measurement point for the reception of the station considered, f) estimating, for each slot s and each antenna configuration a of the mobile, the ratio $E_s/I_0$, on the basis of the estimates of the propagation channel, and deducing therefrom the interference factor IF associated with the mobile placed at the measurement point, g) determining the services that can be ensured at the measurement point and compare the value of the interference factor IF obtained in step f) with the threshold values dependent on each type of service.

2. The method as claimed in claim 1 wherein the network is a UMTS or IS95 or CDMA2000 network.

3. The method as claimed in claim 2 wherein the step of detection of multisensor synchronization for a UMTS FDD application comprises the following steps:

detection of the sequences of primary synchronization (P-SCH) present at the start of each slot of the UMTS FDD frame, detection of the sequences of secondary synchronization (S-SCH) present at the bit rate of each slot of the UMTS FDD frame and determination of the scrambling code group, detection of the scrambling sequence used by the detected base station.

4. The method as claimed in claim 1 wherein the power Pi is expressed in the following manner:

$$Pi = \frac{1}{Npath * Nslot} \sum_s \sum_i h(i,s)^H h(i,s)$$

where $h(i,s)^H$ corresponds to the conjugate transpose of the vector h(i,s), Nslot to the number of slots on which the estimation is carried out and $N_{path}$ to the number of antennas of the network of sensors of the device.

5. The method as claimed in claim 2 wherein the receiver of a mobile station is a Rake receiver having M fingers and in that the estimation of the reception filter is performed in the following manner:

$g(k_i,s,a)=h(k_i,s,a)$ with i=1, ... M, the indices $k_i$ corresponding to the M paths of highest power, $g(k_i,s,a)=0$ otherwise.

6. The method as claimed in claim 1 wherein the value of the ratio $E_s/I_0$ is determined on the basis of the estimates of the propagation channel:

$$E_s/I_O(s,a) = \frac{Nu \times Pu}{P_S \alpha(s,a) + \sum_i P_{Si} \beta_i(s,a) + \sigma^2 \gamma(s,a)}$$

with $$\frac{\sum_{\substack{m=-L,\\m\neq 0}}^{L}|R_{gh}(m,s,a)|^2}{|R_{gh}(0,s,a)|^2}=\alpha(s,a)$$

the orthogonality loss factor $$\frac{\sum_{m=-L_i,}^{L_i}|R_{gh_i}(m,s,a)|^2}{|R_{gh}(0,s,a)|^2}=\beta_i(s,a)$$

the extracellular interference factor of station i $$\frac{|R_{gg}(0,s,a)|}{|R_{gh}(0,s,a)|^2}=\gamma(s,a)$$

and $$R_{gh}(m,s,a)=\sum_{k=0}^{L-1}g(k+m,s,a)^H h(k,s,a)$$

$$R_{gh_i}(m,s,a)=\sum_{k=0}^{L_i-1}g(k+m,s,a)^H h_i(k,s,a)$$

-continued $$R_{gg}(m,s,a)=\sum_{k=0}^{L_i-1}g(k+m,s,a)^H g(k,s,a)$$

for $m=-L,\ldots,L$.

7. The method as claimed in claim 6 wherein the interference factor IF is determined in the following manner:

$$IF(s,a)=\frac{1}{\alpha(s,a)+\sum_i \beta_i(s,a)}$$

8. The method as claimed in claim 7 wherein a mobile is in contact with several base stations and the interference factor is equal to the sum of the interference factors obtained for each base station of the group of active stations.

9. The method as claimed in claim 1 wherein the mobile performs a reception on a sensor, a corresponds to the index of the antenna taken into account in the network of $N_{path}$ implemented by the device, and the filter g is a temporal filter.

10. The method as claimed in claim 1 wherein the mobile performs a reception on several sensors, corresponds to the indices of the antennas taken into account and the filter g is a spatio-temporal filter.

* * * * *